United States Patent [19]

Savitsky et al.

[11] Patent Number: 4,961,624
[45] Date of Patent: Oct. 9, 1990

[54] OPTICAL FIBER TERMINATION WITH CRIMPING BODY

[75] Inventors: Wallace R. Savitsky; Ronald R. Schaffer; Gary N. Warner, all of Harrisburg, Pa.

[73] Assignee: AMP Incorporated, Harrisburg, Pa.

[21] Appl. No.: 400,303

[22] Filed: Aug. 29, 1989

[51] Int. Cl.⁵ .............................................. G02B 6/26
[52] U.S. Cl. ............................. 350/96.20; 350/96.10
[58] Field of Search ............... 350/96.20, 96.10, 96.21, 350/96.22, 96.23

[56] References Cited

U.S. PATENT DOCUMENTS

| | | | |
|---|---|---|---|
| 4,190,317 | 2/1980 | Makuch | 350/96.20 |
| 4,198,119 | 4/1980 | Uberbacher | 350/96.20 |
| 4,204,306 | 5/1980 | Makuch | 350/96.20 X |
| 4,362,356 | 12/1982 | Williams et al. | 350/96.20 |
| 4,368,948 | 1/1983 | Despouys | 350/96.20 |
| 4,387,957 | 6/1983 | Mignien | 350/96.21 |
| 4,440,469 | 4/1984 | Schumacher | 350/96.20 |
| 4,607,911 | 8/1986 | Rhodes | 350/96.20 |
| 4,679,895 | 7/1987 | Huber | 350/96.20 |
| 4,738,507 | 4/1988 | Palmquist | 350/96.21 |
| 4,887,875 | 12/1989 | Chang et al. | 350/96.21 |
| 4,898,446 | 2/1990 | Hinckley | 350/96.20 |
| 4,911,518 | 3/1990 | Miller | 350/96.20 |
| 4,913,523 | 4/1990 | Yoshida et al. | 350/96.20 |

Primary Examiner—Brian Healy

[57] ABSTRACT

A termination for a fiber optic cable has a connector and an optical fiber member having flexible buffer and optical fiber with the connector comprising an alignment ferrule having tubular passageway for encircling the flexible buffer and optical fiber and a tip with centrally-disposed aperture therethrough for receiving an end of the fiber from the tubular passageway. The termination further includes a crimping body of deformable, elastic material intimately surrounding the flexible buffer and optical fiber and attached by crimping thereto and engaged by compression fitting within the tubular passageway and against the walls of the tubular passageway. The compression fit provides a fit resistant to disengagement.

11 Claims, 2 Drawing Sheets

OPTICAL FIBER TERMINATION WITH CRIMPING BODY

FIELD OF THE INVENTION

This invention relates to a termination for an optical fiber for interconnecting the fiber to another optical fiber or device. The termination is characterized by a crimping body of deformable, elastic material intimately surrounding the optical fiber and engaged by compression fitting within an alignment ferrule of a connector.

BACKGROUND OF THE INVENTION

Optical fibers include a fiber with a flexible buffer and strength members extending axially of the buffer and an external jacket. These fibers may be interconnected one to the other or to other optical devices by terminating the fiber within a connecting body having an alignment ferrule and a tip. The termination must permit accurate axial alignment of the light conducting fiber of the connection. Toward this end, optical fiber terminations often include a precision means to provide axial alignment and clamping or gripping means to prevent longitudinal movement of the fiber within the connector body. Connectors for such terminations are disclosed by Schaffer, et al, copending U.S. Pat. No. 399,805, filed 8/29/89. The present invention is a termination for an optical fiber which includes a connector and which provides axial alignment and means to prevent longitudinal movement as provided by a single body.

SUMMARY OF THE INVENTION

An object of the present invention is to provide a termination for optical fibers which is simple and inexpensive to construct and which achieves precise axial alignment and prevents longitudinal movement. It is further an object to provide a termination which can be constructed without the need of special tools and without adhesives.

The present invention is a termination for optical members comprising a connector and an optical fiber member. The optical fiber member has a flexible buffer and fiber. The connector comprises an alignment ferrule having tubular passageway for encircling the optical member and a tip with centrally disposed aperture therethrough for closely receiving an end of the fiber from the tubular passageway.

The termination further comprises a crimping body of deformable, elastic material intimately surrounding the flexible buffer and fiber and attached by crimping thereto and engaged by compression, fitting, together with the flexible buffer and fiber, within the tubular passageway and against the walls of the tubular passageway to provide a fit resistant to disengagement.

A known clamp for an optical fiber is disclosed by Lukas, et al., U.S. Pat. 3,946,467, which relates to a clamp with a tubular portion which is fairly close sliding fit on the fiber. The clamp further has an axially split portion with at least one deformable finger. An axially split sleeve slides on the clamp along the tubular portion to the slit portion to deform the finger to grip the fiber. Differing is a termination for an optical fiber including a connector with an alignment ferrule wherein a crimping body intimately fits an optical fiber and is elastically deformable upon insertion into the tubular passageway to provide a secure fit within the connector.

Schumacher, U.S. Pat. No. 4,440,469, relates to a connector assembly constructed by inserting an optical waveguide through the forward aperture of a primary ferrule and then inserting the combination into the rearward larger diametered portion of the axial bore of a contact body. A tapered forward end of the primary ferrule wedges into a taper of the inner walls of the contact body to provide a "sealed" interface.

By the present invention, a body of deformable elastic material is crimped to the buffer and fiber of an optical member, to intimately surround the flexible buffer prior to insertion into the tubular passageway of an alignment ferrule. Intimate crimping of the body to the optical member permits prefabrication at a manufacturing site and transportation of the combined crimping body and optical member as an integral piece to a field connection location.

Other advantages and aspects of the invention are apparent by way of example from the detailed description that follows and from the accompanying drawings.

DETAILED DESCRIPTION OF THE INVENTION

Figure 1:
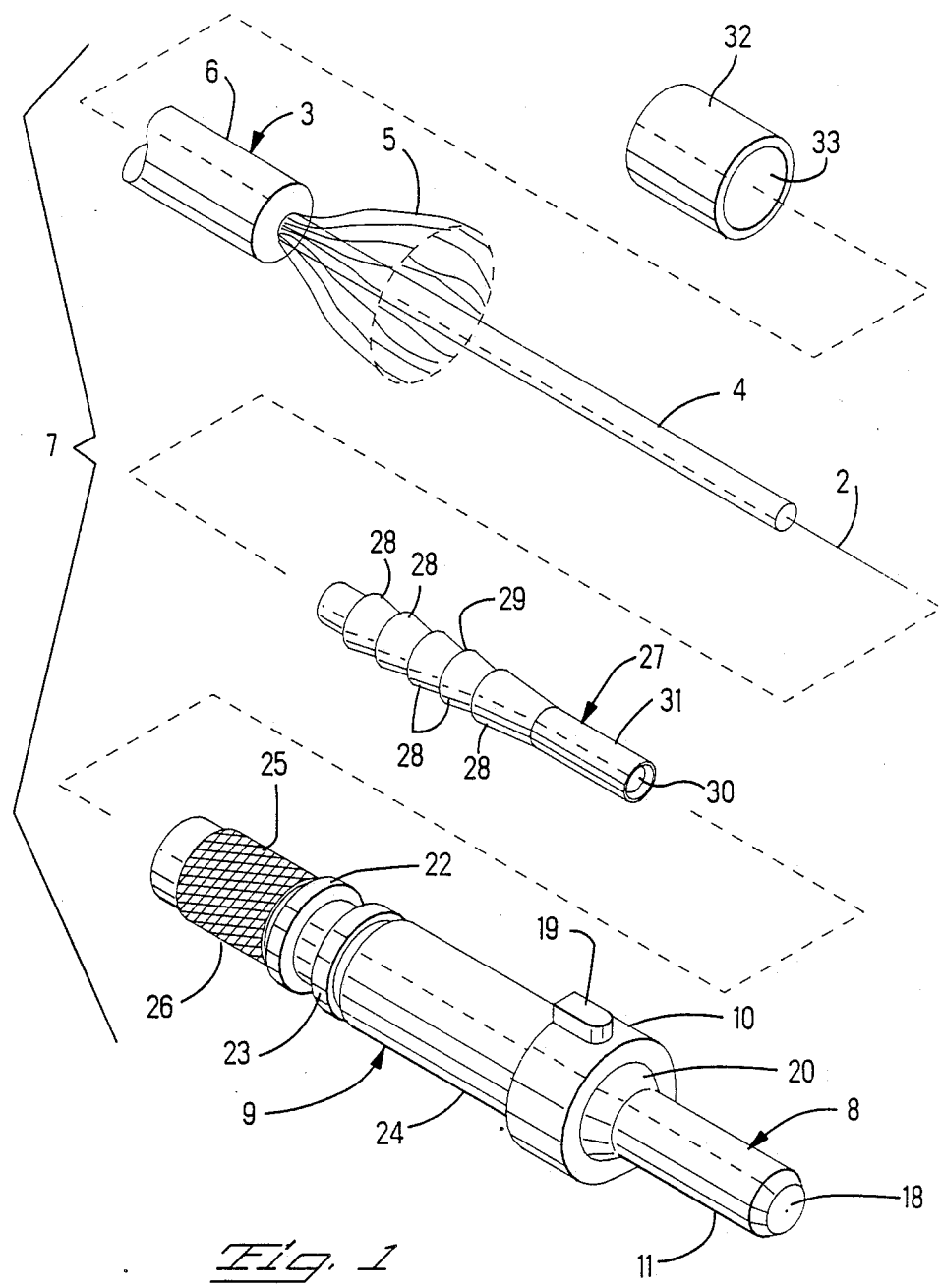
FIG. 1 is a fragmentary perspective view of the termination for optical members.
Figure 2:
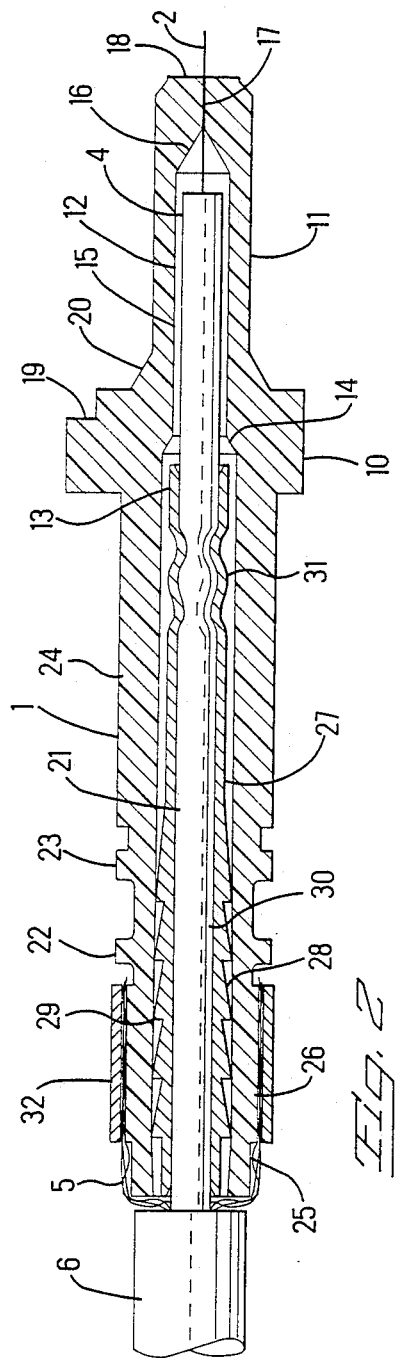
FIG. 2 is an enlarged section view through the termination of the present invention.

With reference to FIGS. 1 and 2, is shown a connector 1 for an optical fiber 2 of an optical fiber cable 3. The cable 3 is of known construction and includes a flexible buffer 4, concentrically encircling the fiber 2, multiple strands of strength members 5 extending axially of the buffer 4 and distributed around the periphery of the buffer 4 and an external jacket 6. The connector 1 consists of a single, unitary piece having two parts, a tip 8, and a ferrule 9. The tip 8 has flange portion 10 and nose portion 11. The tip 8 may be made of a hard, metal material, such as brass, or a deformable material, such as a thermal plastic. The tip 8 has a profile through passage 12 with entry section 13 truncated, conical surface 14 leading to exit passage 15. Profiled axial bore 16 is aligned with exit passage 15, leading to narrow exit bore 17 at front mating surface 18. In FIGS. 1 and 2, the outside of the tip 8 is profiled by key 19 and tapered surface 20 between flange 10 and nose 11.

Ferrule 9 is an elongated, sleeve body having a through passage or tubular passageway 21 extending through the ferrule 9 which, further, has flanges 22 and 23 at its rearward end and barrel-shaped front 24 and rear 25 portions with rear portion 25 includes a rear barrel section having a rear section with a knurled surface 26.

It is notable that the connector is shown as a single piece, but the ferrule 9 may be a separate piece from the tip 8 and may be attached thereto by threading the bodies together.

Crimping body 27 is in a shape of a series of stacked, truncated cone-shaped sections 28 having annular lips 29 at each of their outer circumferences. The crimping body 27 features a central passageway 30 for the optical fiber 2 and buffer 4. The crimping body 27 also has crimping section 31 which is compressably attached by a crimping tool into intimate contact with the buffer 4 of the optical fiber cable 3. As shown in FIG. 2, the crimping body 27 is engaged into the connector 1 by compression fitting of the lips 29 against the walls of the tubular passageway 21 of the ferrule 9.

The termination 7 of the present invention includes connector 1, optical fiber cable 3 and crimping body 27. Sleeve 32 has through passage 33 of a diameter so that it forms a close fit over the rear barrel section 25 of ferrule 9 at knurled surface 26 as hereinafter described.

Figure 3:
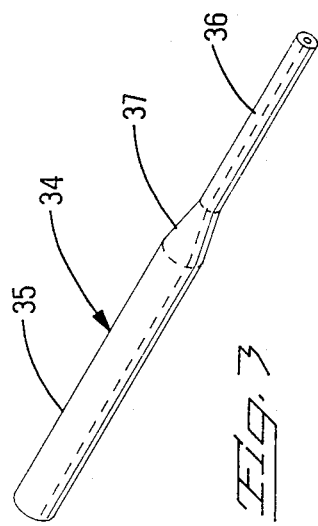
FIG. 3 shows a perspective view of an embodiment of the crimping body of the termination of the present invention.

FIG. 3 shows a crimping body 34 of deformable material which is bottle-shaped with body 35, neck 36 and transition area 37 in the shape of a truncated cone. With this embodiment, the body section 35 is of slightly greater diameter than the through passageway 21 of ferrule 9 of the connector 1. The neck 36 of the body 34 is crimped to the buffer 4 of the optical fiber cable 3, and the combination is inserted into the tubular passageway 21 of the connector 1 by compression fitting of the body 34 within the passageway.

Referring again to FIGS. 1 and 2, the present invention is utilized with a standard optical fiber cable 3 by first preparing the cable 3 in a known fashion to expose strength members 5 and a section of the buffer 4 and fiber 2. The section of buffer 4 and fiber 2 is inserted into the crimping body completely therethrough, so that a portion of the exposed section extends beyond the front section of the crimping body. The combination of the section of buffer 4 and fiber 2 and crimping body 31 is then inserted into the ferrule 9 of the connector 1. Since the circumference defined by the lips 29 of the crimping body 27 is slightly greater than the circumference of the tubular passageway 21 of the ferrule 9, the combination of the crimping body and section of buffer 4 and fiber 2 must be forcibly inserted within the passageway 21. Since the crimping body 27 is of deformable material, the lips 29 of the body 27 may be compressably forced by close fitting against the walls of the passageway 21 so that once inserted completely within the body 9, the lips 29 of the crimping body 27 will resist longitudinal movement by the barb fit of the lips 29 against the walls of the tubular passageway 21. The buffer 4 and fiber 2 section pass into the through passage 12 of the tip 8, and the truncated alignment surface 14 provides a precision alignment of the buffer 4 and fiber 2 section through the exit passage 15 of the tip 8. The stripped fiber 2 that extends beyond the exposed buffer 4 is fitted to and into the narrow exit bore 17 and through the front mating surface 18 of the tip 8. Strength members 5 are clamped between the knurled surface 26 of the barrel-shaped rear section 25 of ferrule 9 and sleeve 32 which has been moved axially along optical fiber cable 3 to position around the rear section 25. Knurling 26 provides increased friction to retain the sleeve 32 and strength members 5 in place. After preparation of the fiber 2 protruding from the mating surface 18, the connector 1 can be used in a connection with a known receptacle body (not shown).

It is to be understood that while the described termination of FIGS. 1 and 2 is a preferred embodiment, other configurations of crimping body and connector are intended to be within the scope of the present invention, so long as the crimping body intimately surrounds the flexible buffer and fiber and is attached thereto by crimping and is engaged by compression fitting, together with the buffer and fiber, within the tubular passageway of the connector and against the walls of the passageway to provide a fit resistant to disengagement. For example, the inner walls of the tubular passageway could be characterized by one or more annular flanges having lips to compress against the crimping body to provide the fit resistant to disengagement. Further, the connector could be in two disengageable sections—an alignment ferrule and a tip, connected by threading one to the other, or by compression fit.

It is notable that the assembly of the termination of the present invention characterized by the crimping body of deformable, elastic material may be accomplished by a simple tool without the necessity of any adhesive or special tools. This is a particular advantage of the use of the termination of the present invention in the field or in adverse conditions, and is also of particular advantage as to ease of manufacturing. Of further advantage is that a fiber optic cable may be fitted with an adapting crimping body at a place of manufacture and the combination utilized in the field, with a variety of types of connectors and fitted together under adverse conditions.

We claim:

1. A termination for optical members comprising, a connector and an optical fiber member having a flexible buffer and an optical fiber, wherein the connector comprises, an alignment ferrule having a tubular passageway for encircling the buffer and the optical fiber, and a tip with a centrally disposed aperture therethrough for closely receiving an end of the optical fiber extending from the passageway, wherein the improvement comprises;

a crimping body of deformable material intimately surrounding the buffer and the optical fiber and attached by crimping thereto and engaged by compression fitting, together with the buffer and the optical fiber, within the passageway and against walls of the passageway to provide a fit resistant to disengagement, the crimping body being in the shape of a series of stacked, truncated, cone shaped sections with annular lips at outer circumferences of the sections and having a central passageway for receiving the optical fiber and engaged by compression fitting of the lips against the walls of the tubular passageway.

2. A termination for optical members comprising, a connector and an optical fiber member having a flexible buffer and an optical fiber, wherein the connector comprises, an alignment ferrule having a tubular passageway for encircling the buffer and the optical fiber, and a tip with a centrally disposed aperture therethrough for closely receiving an end of the optical fiber extending from the passageway, wherein the improvement comprises;

a crimping body of deformable material intimately surrounding the buffer and the optical fiber and attached by crimping thereto and engaged by compression fitting, together with the buffer and the optical fiber, within the passageway and against walls of the passageway to provide a fit resistant to disengagement, and the tubular passageway is characterised by one or more annular flanges having lips to compress against the crimping body.

3. The termination of claim 1, wherein the alignment ferrule comprises two disengageable sections being an alignment ferrule section and a tip section, the sections being connected by threading one to the other.

4. A termination for optical members comprising, a connector and an optical fiber member having a flexible buffer and an optical fiber, wherein the connector comprises, an alignment ferrule having a tubular passageway for encircling the buffer and the optical fiber, and a tip with a centrally disposed aperture therethrough for closely receiving an end of the optical fiber extending from the passageway, wherein the improvement comprises;

a crimping body of deformable material intimately surrounding the buffer and the optical fiber and attached by crimping thereto, and engaged by compression fitting, together with the buffer and the optical fiber, within the passageway and against walls of the passageway to provide a fit resistant to disengagement, the alignment ferrule comprises two disengageable sections being an alignment ferrule section and a tip section, the sections being connected by threading one to the other, and a tubular passageway of the alignment ferrule section is characterized by one or more annular flanges having lips to compress against the crimping body.

5. A termination according to claim 1, comprising; a projecting key on the exterior of the alignment ferrule.

6. A termination for an optical fiber cable, comprising; an alignment ferrule having a passageway, a crimping body in the alignment ferrule having crimping section secured by crimping to a buffer surrounding an optical fiber of an optical fiber cable, the optical fiber extending outwardly from the crimping section and at a mating face on a tip of the alignment ferrule, and deformable means along a rear of the crimping body being deformably fit in the passageway for resisting disengagement of the crimping body and the alignment ferrule.

7. A termination as recited in claim 6, comprising; strength members of the cable secured to the alignment ferrule.

8. A termination as recited in claim 6, comprising; the buffer extending outwardly from the crimping section and remaining within the alignment ferrule, and the optical fiber extending outwardly from the buffer and at the mating face.

9. A termination as recited in claim 6, comprising; the deformable means includes multiple lips barb-fit in the passageway.

10. A termination as recited in claim 6, comprising; the deformable means includes multiple truncated conical sections compressibly fit in the passageway.

11. A termination as recited in claim 6, wherein, the crimping section is forward of the deformable means in the passageway.

* * * * *